(12) United States Patent  
Dominic et al.

(10) Patent No.: US 7,897,912 B2  
(45) Date of Patent: Mar. 1, 2011

(54) SPECTRAL AND LUMINANCE MEASURING DEVICE EMPLOYING ARRAY AND SINGLE-CHANNEL DETECTORS IN COMBINATION

(75) Inventors: Francis A. Dominic, Granada Hill, CA (US); Thomas H. Bulpitt, Westchester, CA (US); Gerald M. Heigel, Granada Hills, CA (US)

(73) Assignee: Photo Research, Inc., Chatsworth, CA (US)

( * ) Notice: Subject to any disclaimer, the term of this patent is extended or adjusted under 35 U.S.C. 154(b) by 0 days.

(21) Appl. No.: 11/420,399

(22) Filed: May 25, 2006

(65) Prior Publication Data

US 2007/0272844 A1 Nov. 29, 2007

(51) Int. Cl.
*G01J 3/02* (2006.01)
*G01J 3/18* (2006.01)

(52) U.S. Cl. ........................ 250/239; 356/326
(58) Field of Classification Search .............. 250/208.1, 250/207, 214 VT, 578.1; 356/222, 326, 327, 356/328, 329, 330, 319, 320
See application file for complete search history.

(56) References Cited

U.S. PATENT DOCUMENTS 5,528,368 A * 6/1996 Lewis et al. ................. 356/456
5,745,229 A * 4/1998 Jung et al. .................... 356/73
5,825,478 A * 10/1998 Wilcox et al. ................. 356/73
6,115,123 A * 9/2000 Stappaerts et al. .......... 356/457
6,646,727 B2 * 11/2003 Saleh et al. ................ 356/73.1
7,154,602 B2 * 12/2006 Wachsmuth ................ 356/417
7,230,691 B2 * 6/2007 Niki .......................... 356/73.1
2003/0067601 A1 * 4/2003 Asami et al. ................ 356/328
2005/0123979 A1 * 6/2005 Weiss et al. .................... 435/6

FOREIGN PATENT DOCUMENTS

WO    WO 2005015139 A1 *  2/2005

OTHER PUBLICATIONS

Reed D. Meyer, Kevin J. Kearney, Zoran Ninkov, Christopher T. Cotton, Peter Hammond, And Bryan D. Statt, RITMOS: a micromirror based multi-object spectrometer, Oct. 5, 2004, SPIE, vol. 5492, 200.*

* cited by examiner

*Primary Examiner*—Tony Ko
(74) *Attorney, Agent, or Firm*—Edwards Angell Palmer & Dodge LLP; Peter C. Schechter; Christopher J. Capelli

(57) ABSTRACT

An apparatus for measuring light properties includes a housing defining a light input port; as well as a first light detector; a second light detector; and a coupling element. The first light detector is a single channel light detector or a multiple channel light detector. The second light detector is a multiple channel light detector. The coupling element is configured and arranged to selectively couple light incident from the light input port to one of the first light detector and the second light detector. As an alternative, a beam splitting element can be used instead of the coupling element. The beam splitting element receives light from the light input port and then splits the light and delivers a portion of the light to the first light detector and a portion of the light to the second light detector.

16 Claims, 4 Drawing Sheets

US 7,897,912 B2

SPECTRAL AND LUMINANCE MEASURING DEVICE EMPLOYING ARRAY AND SINGLE-CHANNEL DETECTORS IN COMBINATION

FIELD

The present invention is directed to the area of apparatuses containing multiple light detectors that can be selectively or simultaneously illuminated by target light, as well as methods of manufacture and use of the apparatuses.

BACKGROUND

The measurement of characteristics of light, such as radiance, luminance, reflectance, transmittance, contrast, color, color temperature, spectral power distribution, illuminance, etc. is useful for a wide range of applications. Example of such applications include, but is not limited to, photography, displays (e.g., CRT, LED, or plasma displays), room lighting and lamps, instrument panels, roadway lighting, automotive lighting, airport lighting, specimen analysis, dental/medical analysis (e.g., tooth color, tissue analysis, DNA analysis, eye analysis, skin analysis, etc.), chemical analysis (material/compound analysis), textile & paint color analysis and matching, water/ocean/lake pollution analysis, wine vintage analysis, and the like.

A variety of detectors can be used to observe the desired properties of the light. Photomultiplier tubes (PMTs), photodiodes and other single channel light detectors have been used in photometry. Such detectors may be selected to simulate the light response of the human eye, with or without filters. Multiple channel light detectors, such as arrays of detectors, can be used for colorimetry, spectrophotometry, and spectroradiometry. Such arrays include arrays of photomultiplier tubes, as well as self scanned arrays, such as photodiode arrays, CMOS arrays, charge-coupled device (CCD) arrays, and the like.

BRIEF SUMMARY

One embodiment is an apparatus that includes a housing defining a light input port; as well as a first light detector; a second light detector; and a coupling element, all of which are disposed in the housing. The first light detector is a single channel light detector or a multiple channel light detector. The second light detector is a multiple channel light detector. The coupling element is configured and arranged to selectively couple light incident from the light input port to either one of the first light detector and the second light detector. In one preferred embodiment, the first light detector is a single channel light detector. Examples of coupling elements include coupling elements that selectively move a selected one of the first and second light detectors into the light path; and movable coupling elements that direct light toward a selected one of the first and second light detectors.

Another embodiment is an apparatus that includes a housing defining a light input port; as well as a first light detector; a second light detector; and a beam splitting element, all of which are disposed in the housing. The first light detector is a single channel light detector or a multiple channel light detector. The second light detector is a multiple channel light detector. The beam splitting element receives light from the light input port and then splits the light and delivers a portion of the light to the first light detector and a portion of the light to the second light detector. In one preferred embodiment, the first light detector is a single channel light detector.

Yet another embodiment is a method of measuring properties of light that includes providing an apparatus having a first light detector and a second light detector. The first light detector is a single channel light detector or a multiple channel light detector and the second light detector is a multiple channel light detector. Light is received into the apparatus and selectively directed, using a coupling element, to one of the first light detector and second light detector and subsequently to the other one of the first light detector and second light detector. In one preferred embodiment, the first light detector is a single channel light detector. Examples of coupling elements include coupling elements that selectively move a selected one of the first and second light detectors into the light path; and movable coupling elements that direct light toward a selected one of the first and second light detectors.

A further embodiment is a method of measuring properties of light that includes providing an apparatus having a first light detector and a second light detector. The first light detector is a single channel light detector or a multiple channel light detector and the second light detector is a multiple channel light detector. Light is received into the apparatus and directed, using a beam splitting element, to both the first light detector and second light detector simultaneously.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of apparatuses containing multiple light detectors that can be selectively or simultaneously illuminated by target light, as well as methods of manufacture and use of the apparatuses.

An apparatus can include multiple light detectors, for example, at least one single channel light detector and at least one multiple channel light detector; or two or more multiple channel light detectors. The detectors are disposed in a housing with a coupling channel that selectively or simultaneously directs light from a light source, external to the housing, to the light detectors for measurement of desired properties. This allows a user to measure light properties with two different detectors using a single device. Examples of light properties that might be measured, depending on apparatus configuration and application, include, but are not limited to, radiance, luminance, reflectance, transmittance, contrast, color, color temperature, spectral power distribution and illuminance. It will be understood that each apparatus may be configured to only measure a subset of these properties. The apparatus may be, for example, a photometer/spectrophotometer, photometer/spectroradiometer, photometer/colorimeter, colorimeter/spectroradiometer, spectrophotometer/spectroradiometer, camera/photometer, camera/spectroradiometer, or the like. A camera can be considered a video photometer.

A variety of different coupling elements can be used to selectively or simultaneously deliver light to the detectors in the apparatus. One example is a beam splitting element that splits and delivers light simultaneously to multiple detectors. Another example is an element that moves a selected light detector into the light path. Yet another example is a movable optical element, such as a mirror, that directs the light to the selected detector. Simultaneous illumination of multiple detectors can be useful for measuring a number of optical properties relatively quickly. On the other hand, sequential illumination of multiple detectors may allow each of the detectors to see the entire light input, if desired.

Previously, for example, display manufactures would use one instrument with a single channel light detector, such as a photomultiplier tube (PMT), to measure contrast and then switch to a second instrument with a multiple channel light detector, such as a self scanning diode array, to measure color. Using two different instruments can slow the measurement process. Moreover, using a single instrument with multiple detectors can assist in ensuring that each of the detectors is sampling the same light environment. Additional time for alignment with the desired light environment may be required when using multiple instruments.

Figure 1:
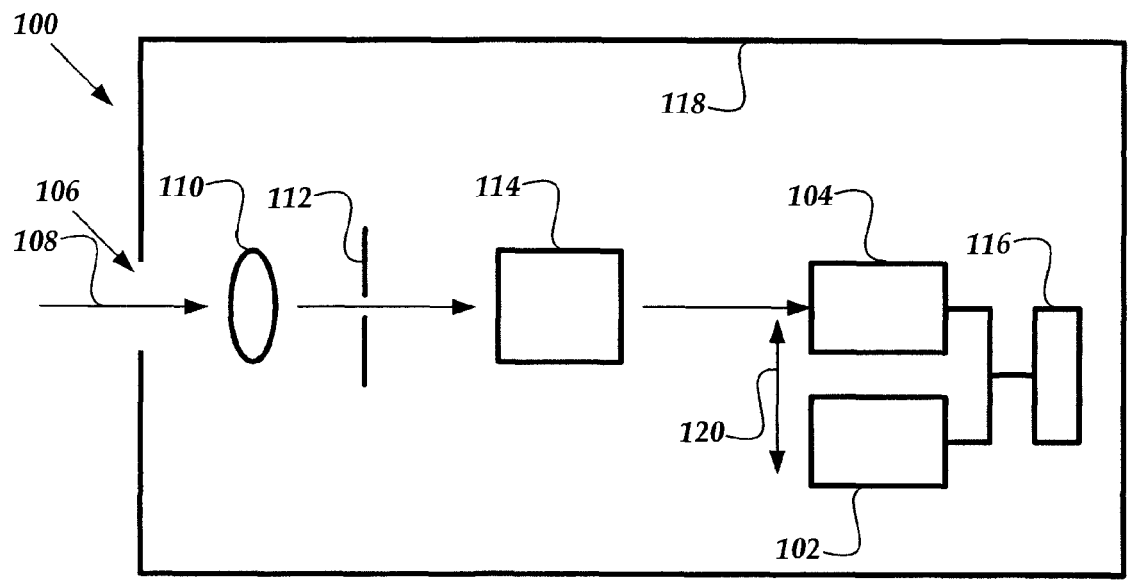
FIG. 1 is a schematic illustration of one embodiment of an apparatus for observing light using at least two detectors which are selectively moved into the light path by a coupling element.

FIG. 1 illustrates one example of an apparatus 100 that includes two detectors 102, 104 that are selectively illuminated by light 108 entering the apparatus through a light entry port 106 in the apparatus housing 118. A coupling element 116 moves (movement exemplified by arrow 120) the detectors 102, 104 to select which detector is illuminated by the light 108. In particular, the coupling element 116 moves the selected detector into the light path. The apparatus can optionally include an input optic 110, such as an objective lens, as well as other optical components 114 in the light path for manipulating (e.g., redirecting, focusing, collimating, dispersing, telecentric coupling, depolarizing, polarization rotating, etc.) the light 108. The apparatus may also include a field stop 112 to define the area of observation in object space. The apparatus can also include a display and/or a data collection element (not shown) for providing a user with information regarding the light observed by detectors 102, 104. The apparatus may also include a processor (not shown) for processing signals provided by the detectors 102, 104 in response to the light 108.

Figure 2:
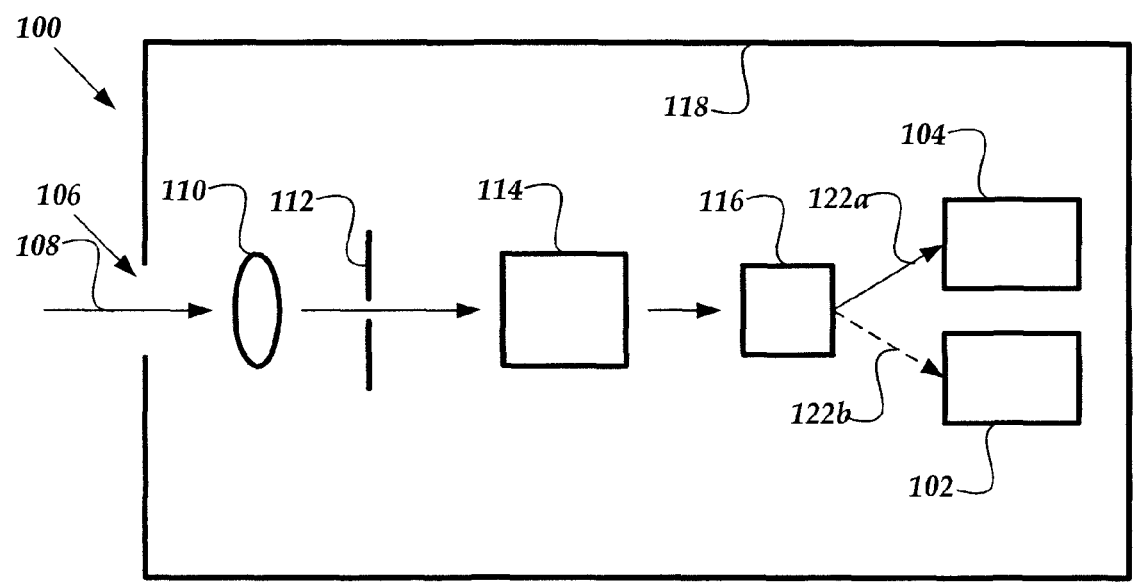
FIG. 2 is a schematic illustration of one embodiment of an apparatus for observing light using at least two detectors with a coupling element that selectively directs light to either one of the detectors.
Figure 3:
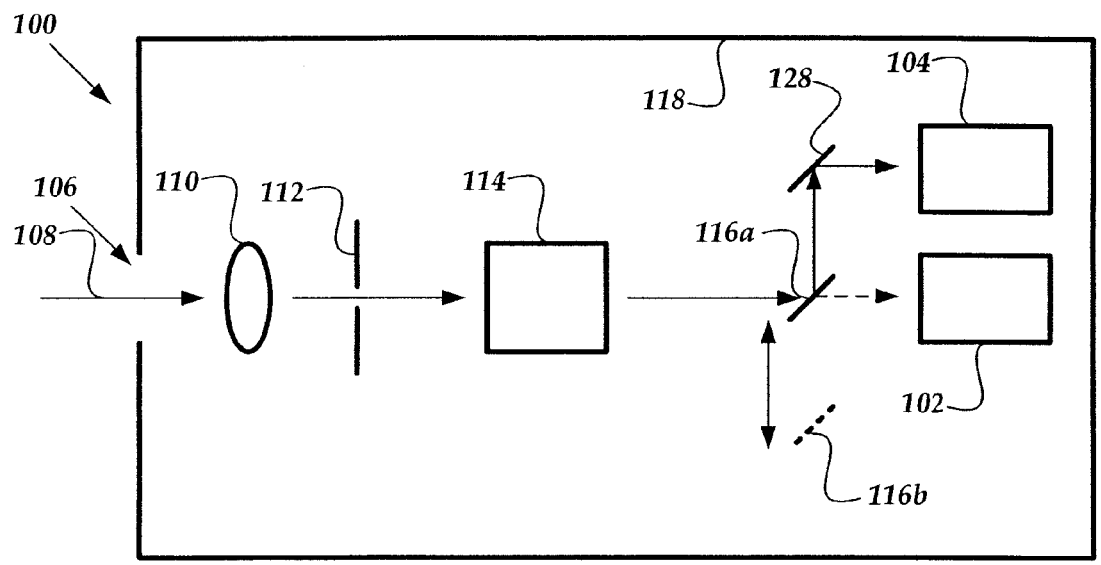
FIG. 3 is a schematic illustration of one embodiment of the apparatus of FIG. 2 in which the coupling element is a translatable optical element, such as a mirror.
Figure 4:
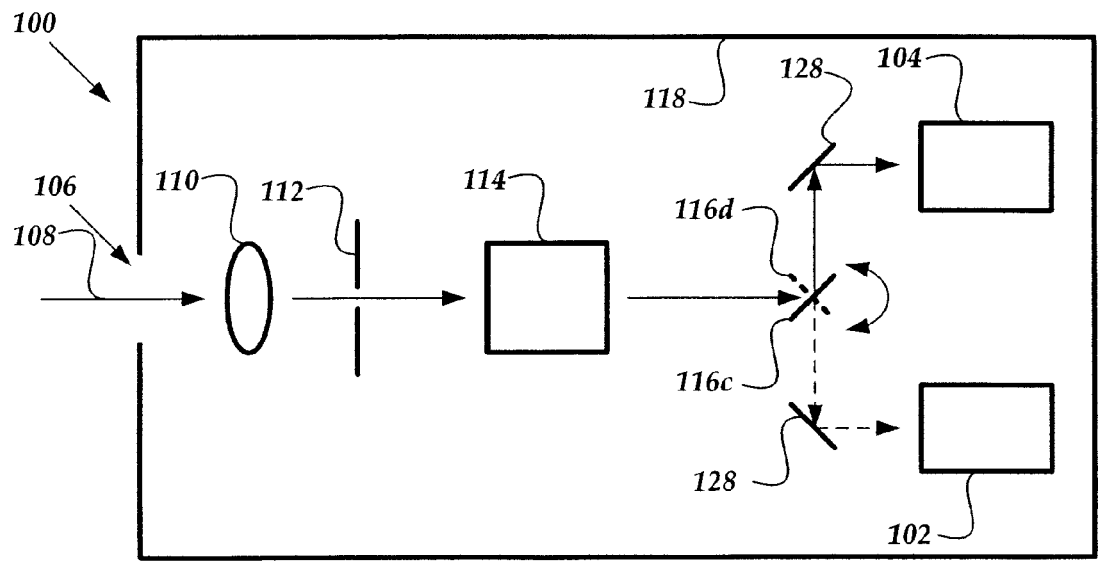
FIG. 4 is a schematic illustration of another embodiment of the apparatus of FIG. 2 in which the coupling element is a rotatable optical element, such as a mirror.
Figure 5:
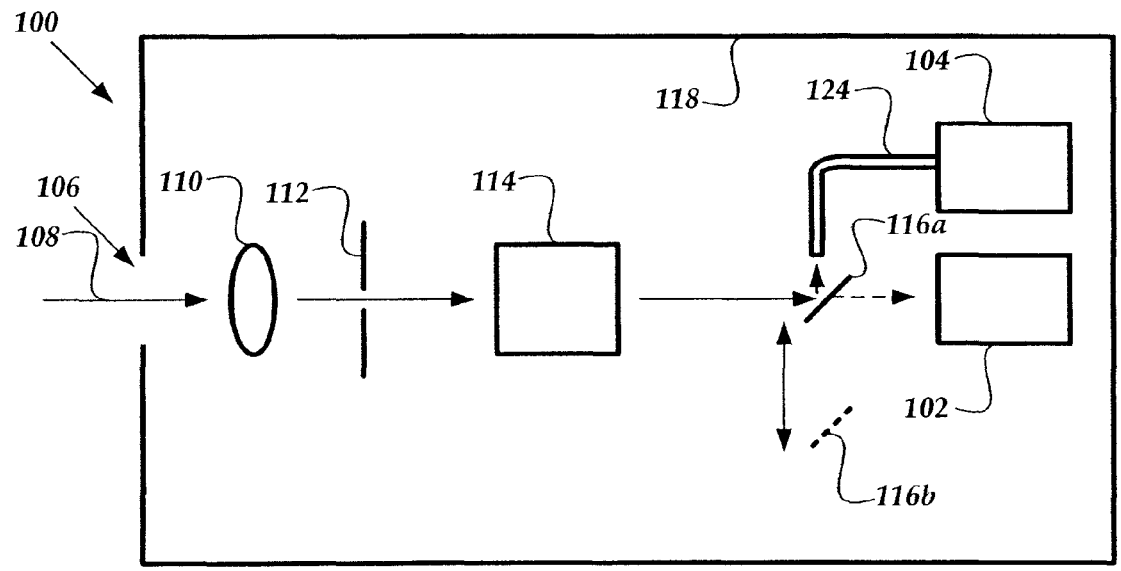
FIG. 5 is a schematic illustration of another embodiment of the apparatus of FIG. 2 in which the coupling element is a translatable optical element, such as a mirror.

FIG. 2 illustrates a second embodiment that contains a coupling element 116 that selectively directs to the light along one of two or more light paths (122a, 122b) to the selected detector. FIG. 3 illustrates one example in which the coupling element is a movable optical element, such as a mirror, prism, beamsplitter, another type of reflector, or a fiber bundle, that has at least two positions (e.g., reference numerals 116a, 116b) to selectively direct light to the first detector 104 (position 116a) or the second detector (position 116b). FIG. 4 illustrates another embodiment in which the coupling element is a rotatable optical element, such as a mirror, prism, beamsplitter, or another type of reflector, that has at least two rotational positions (e.g., positions 116c, 116d) to selectively direct light to the first detector 104 (position 116c) or the second detector (position 116d). FIG. 5 illustrates an embodiment similar to that in FIG. 3 except that the light is directed along a fiber optic 124 towards the first detector 104 when the coupling element is in position 116a. It will be recognized that any of these embodiments can be adapted to be used with an apparatus having three or more detectors.

Figure 6:
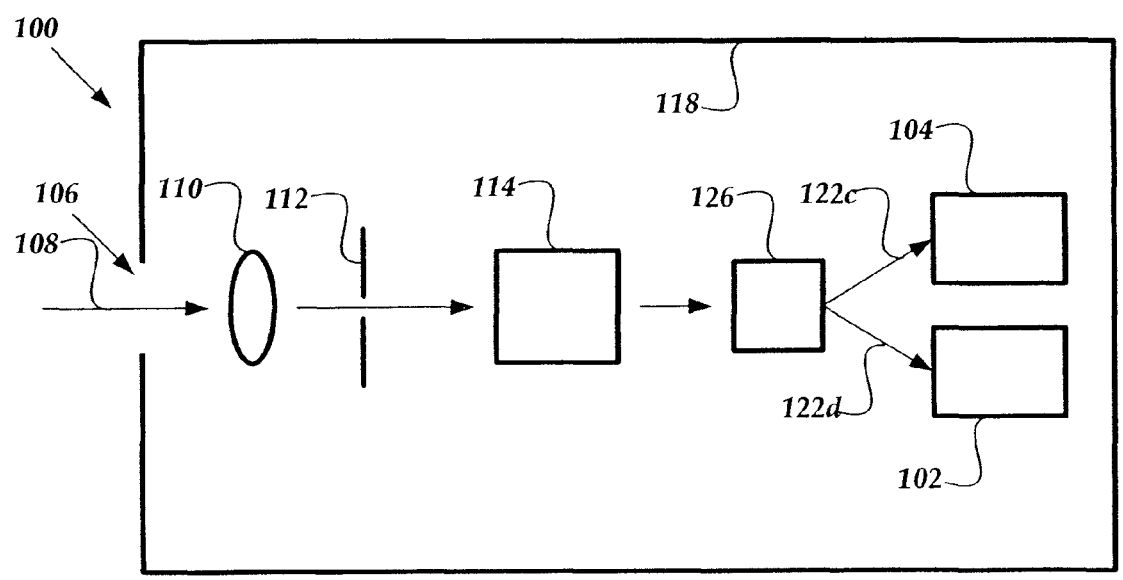
FIG. 6 is a schematic illustration of one embodiment of an apparatus for observing light using at least two detectors with a beam splitting element that splits the light and delivers it simultaneously to the detectors.

FIG. 6 illustrates yet another embodiment in which light 108 is directed onto a beam splitting element 126, for example, a fiber optic, a solid waveguide, a beamsplitter, or the like. The beam splitting element directs portions of the light simultaneously along at least two paths 122c, 122d to the detectors 102, 104.

Figure 7:
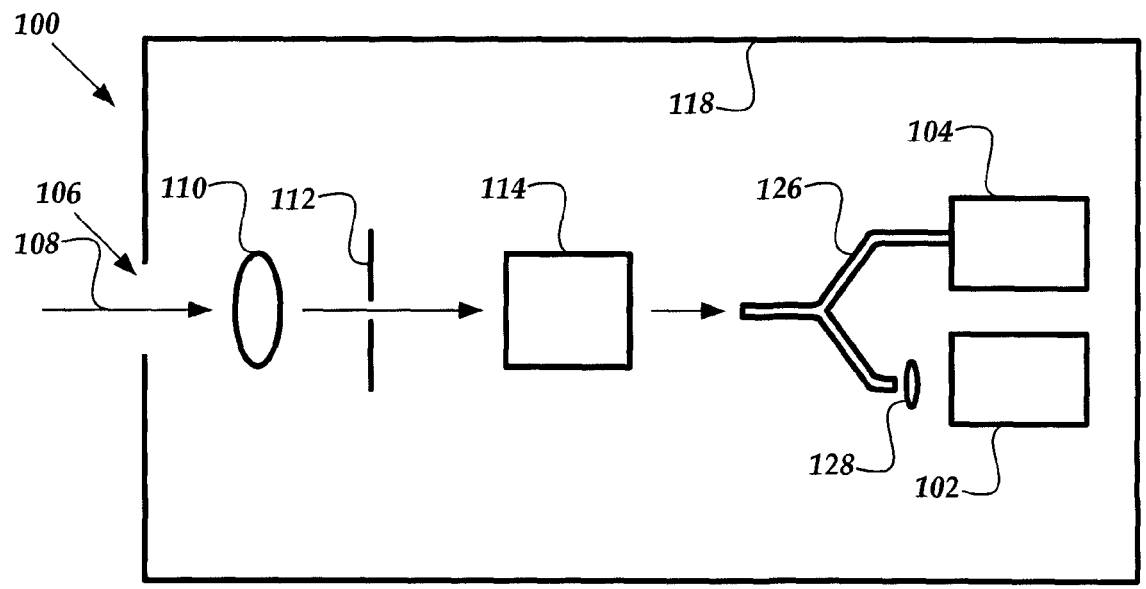
FIG. 7 is a schematic illustration of one embodiment of an apparatus for observing light using at least two detectors with a fiber optic that splits the light and delivers it simultaneously to the detectors.
Figure 8:
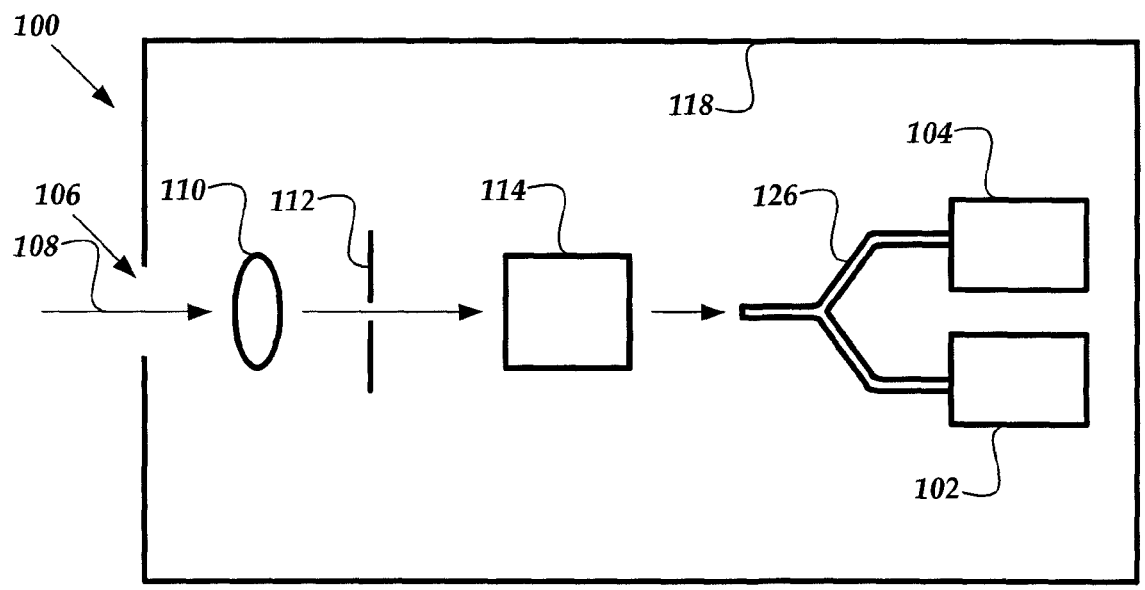
FIG. 8. is a schematic illustration of another embodiment of an apparatus for observing light using at least two detectors with a fiber optic that splits the light and delivers it simultaneously to the detectors.

FIGS. 7 and 8 illustrate embodiments in which the beam splitting element is a fiber optic 126. The optical fiber 126 is split along a distal portion of the fiber to deliver the light simultaneously to each detector 102, 104. Optionally, an optical element 128, such as a lens, can be placed between the optical fiber 126 (or any other beam splitting element or coupling element such as shown in the other Figures) and a detector (e.g., detector 102 in FIG. 7) to focus or otherwise manipulate the light prior to illumination of the detector. It will be recognized that any of these embodiments can be adapted to be used with an apparatus having three or more detectors.

In one preferred embodiment, detector 102 is a single channel light detector and detector 104 is a multiple channel light detector. In another preferred embodiment, detectors 102, 104 are both multiple channel light detectors. Examples of suitable single channel light detectors include photomultiplier tubes, photodiodes, avalanche photodiodes, thermopiles, and the like.

Single channel light detectors can be used in, for example, photometry, colorimetry, and radiometry to measure characteristics such as, for example, contrast, luminance, illuminance, radiance, reflectance, transmittance, color, color temperature, spectral power distribution, and the like. In one embodiment, the detector 102 is part of a photometer, radiometer, or calorimeter. The photometer, radiometer, or colorimeter can be part of the apparatus 100. Alternatively, components of a photometer, radiometer, or calorimeter, or any other device for analyzing signals from the detector 102, can be separate from the apparatus. Such separate components can be coupled to the detector 102 or apparatus 100 via a wired or wireless connection. Similarly, a display for providing a user with information based on the signals from the detector can be provided separate from the apparatus and connected by a wired or wireless connection.

Examples of suitable multiple channel light detectors include arrays of photomultiplier tubes, as well as self scanned arrays, such as photodiode arrays, CMOS arrays, charge-coupled device (CCD) arrays, and the like. A prism, diffraction element, or the like may be used in conjunction with the multiple channel light detector to spread the light spectrally.

Multiple channel light detectors can be used for spectrophotometry, spectroradiometry, colorimetry, and the like to measure characteristics such as, for example, transmittance, reflectance, color, radiance, luminance, contrast, color temperature, spectral power distribution, illuminance, and the like. In one embodiment, the detector 104 is part of a spectrophotometer, spectroradiometer, or calorimeter The spectrophotometer, spectroradiometer, or colorimeter can be part of the apparatus 100. Alternatively, components of a spectrophotometer, spectroradiometer, calorimeter, or any other device for analyzing signals from the detector 104, can be separate from the apparatus. Such separate components can be coupled to the detector 104 or apparatus 100 via a wired or wireless connection. Similarly, a display for providing a user with information based on the signals from the detector can be provided separate from the apparatus and connected by a wired or wireless connection.

The coupling element 116 in FIG. 1 can be any device which selectively moves detectors 102, 104 into position to receive the light 108. Such movement can be, for example, translational, rotational, or any combination thereof. The movement may be accomplished manually or using a motor or the like.

In some embodiments, the movement of the detectors occurs at the user's command. In other embodiments, the apparatus may include a controller, or be coupled to a controller, that can direct movement of the detectors automatically as part of a programmed sequence or at the user's command or both. As an example, the controller may have a programming sequence that positions one of the detectors to receive the light first and then after a suitable period of time repositions the detectors so that the second detector receives the light. An alternative programming sequence may alternate between the multiple detectors two or more times.

In FIGS. 2-5, the coupling element 116, instead of the detectors, is movable to selectively direct light to one of the detectors. For example, the coupling element 116 may be translationally movable (e.g., the embodiments of FIGS. 3 and 5), rotationally movable (e.g., the embodiment of FIG. 4), or any combination thereof. The movement may be accomplished manually or using a motor or the like. It will be recognized that other embodiments of the invention can include any combination of movement of the detectors and movement of a coupling element.

In some embodiments, the movement of the coupling element occurs at the user's command. In other embodiments, the apparatus may include a controller, or be coupled to a controller, that can direct movement of the coupling element automatically as part of a programmed sequence or at the user's command or both. As an example, the controller may have a programming sequence that positions the coupling element to direct the light to one detector and then after a suitable period of time moves (e.g., translates or rotates) the coupling element so that light is directed toward the second detector. An alternative programming sequence may alternate between the multiple detectors two or more times.

Additional optical elements, such as mirror(s) 128 (FIGS. 3 and 4) and/or a fiber optic 124 (FIG. 5), can also assist in delivering light from the coupling element 116 to a detector 102, 104.

The apparatus housing 118 can be made of any suitable material, such as metal, plastic, and combinations thereof. A light entry port 106 is built into the housing 118 to allow light into the apparatus.

The light entry port 106 may also include an entry optic 110, such as an objective lens, diffuser, light pipe, or mirror. The entry optic may, for example, gather and focus the light. Alternatively, the light entry optic 110 can be disposed further within the housing 118. The entry optic 110 is optionally adjustable, either manually, using a controller, or both.

A field stop 112 can be provided in the apparatus to limit the light to a desirable field of view. The field stop 112 is optionally adjustable, in size and/or position, either manually, using a controller, or both. In some embodiments, the field stop 112 may be adjusted for different measurements.

Other optical components 114, such as shutters, lenses, aperture stops, diffractive optics, polarizing optics, and the like, can also be used to manipulate (e.g., redirect, collimate, focus, disperse, telecentric coupling, depolarizing, polarization rotating, etc.) the light in a desired fashion. One of more of these optical components is optionally adjustable, either manually, using a controller, or both.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. An apparatus comprising:
   a housing;
   a light input port means arranged in said housing for inputting incident light generated from outside the housing and having an unknown frequency spectrum;
   a first light detector disposed in the housing, wherein the first light detector is a single channel light detector including a photomultiplier tube which is used for rapid low light level measurement;
   a second light detector disposed in the housing, wherein the second light detector is a multiple channel light detector which used to measure a spectral distribution of light; and
   a coupling element disposed in the housing and configured and arranged to selectively couple light incident from the light input port means to one of the first light detector and the second light detector,
   wherein the coupling element is configured and arranged to selectively move the first light detector and the second light detector to position one of the first light detector and the second light detector to receive light directed from the light input port means.

2. The apparatus of claim 1, wherein the first light detector is a single channel light detector.

3. The apparatus of claim 2, wherein the single channel light detector is a photomultiplier tube or photodiode.

4. The apparatus of claim 1, wherein the second light detector comprises an array of detectors.

5. The apparatus of claim 1, further comprising a photometer, radiometer, or colorimeter, wherein the first light detector is part of the photometer, radiometer, or colorimeter.

6. The apparatus of claim 1, further comprising a spectrophotometer, spectroradiometer, or colorimeter, wherein the multiple channel light detector is part of the spectrophotometer, spectroradiometer, or colorimeter.

7. An apparatus, comprising:
a housing;
a light input port means arranged in said housing for inputting incident light generated from outside the housing and having an unknown frequency spectrum;
a first light detector disposed in the housing, wherein the first light detector is a single channel light detector including a photomultiplier tube which is used for rapid low light level measurement;
a second light detector disposed in the housing, wherein the second light detector is a multiple channel light detector which used to measure a spectral distribution of light; and
a coupling element disposed in the housing and configured and arranged to selectively couple light incident from the light input port means to one of the first light detector and the second light detector,
wherein the coupling element comprises a movable optical element configured and arranged to selectively direct light received from the light input port means to one of the first light detector and the second light detector; and
wherein the movable optical element is translatably movable.

8. An apparatus comprising:
a housing defining a light input port means for accepting light generated from outside the apparatus and having an unknown frequency spectrum;
a first light detector disposed in the housing, wherein the first light detector is a single channel light detector, the first light detector including a photomultiplier tube which is used for rapid low light level measurement;
a second light detector disposed in the housing, wherein the second light detector is a multiple channel light detector which is used to measure a spectral distribution of light; and
a beam splitting element configured and arranged to receive light from the light input port means and then split the light and deliver a portion of the light to the first light detector and a portion of the light to the second light detector.

9. The apparatus of claim 8, wherein the first light detector is a single channel light detector and the single channel light detector is a photomultiplier tube or photodiode.

10. The apparatus of claim 8, wherein the second light detector comprises an array of detectors.

11. The apparatus of claim 8, further comprising a photometer, radiometer, or colorimeter, wherein the first light detector is part of the photometer, radiometer, or colorimeter.

12. The apparatus of claim 8, further comprising a spectrophotometer, spectroradiometer, or colorimeter, wherein the second light detector is part of the spectrophotometer, spectroradiometer, or colorimeter.

13. The apparatus of claim 8, wherein the beam splitting element comprises a fiber optic having a proximal end for receiving the light from the light input port means and a plurality of distal ends for delivering the light to at least the first and second detectors.

14. The apparatus of claim 8, wherein said beam splitting element comprises an optical fiber.

15. A method measuring properties of light, the method comprising:
providing an apparatus comprising a first light detector and a second light detector, wherein the first light detector is a single channel light detector, the first light detector including a photomultiplier tube which is used for rapid low light level measurement, and the second light detector is a multiple channel light detector which is used to measure a spectral distribution of light;
receiving light having an unknown frequency spectrum and which is generated outside the apparatus into the apparatus; and
selectively directing the light, using a coupling element, to one of the first light detector and second light detector and subsequently to another one of the first light detector and second light detector,
wherein selectively directing the light comprises moving the one of the first light detector and second light detector into a position to receive the light and subsequently moving the other one of the first light detector and second light detector into a position to receive the light.

16. A method measuring properties of light, the method comprising:
providing an apparatus comprising a first light detector and a second light detector, wherein the first light detector is a single channel light detector, the first light detector including a photomultiplier tube which is used for rapid low light measurement and the second light detector is a multiple channel light detector which is used to measure a spectral distribution of light;
receiving light having an unknown frequency spectrum and which is generated outside the apparatus into the apparatus; and
selectively directing the light, using a coupling element, to one of the first light detector and second light detector and subsequently to another one of the first light detector and second light detector,
wherein selectively directing the light comprises positioning the coupling element to direct the light to the one of the first light detector and second light detector and subsequently repositioning the coupling element to direct the light to the other one of the first light detector and second light detector, and
wherein repositioning the coupling element comprises translating the coupling element to a new position.

* * * * *